United States Patent [19]

Sunaga et al.

[11] 4,331,909
[45] May 25, 1982

[54] CONTROL CIRCUIT FOR A REEL MOTOR DRIVING CIRCUIT

[75] Inventors: Yoshimitsu Sunaga; Satoru Honda, both of Tokorozawa, Japan

[73] Assignee: Pioneer Electronic Corporation, Tokyo, Japan

[21] Appl. No.: 168,929

[22] Filed: Jul. 15, 1980

[30] Foreign Application Priority Data

Jul. 13, 1979 [JP] Japan .................................. 54/88188

[51] Int. Cl.³ .......................................... B65H 59/38
[52] U.S. Cl. .......................................... 318/6; 318/7; 242/75.51
[58] Field of Search ............... 318/6, 7, 386; 242/189, 242/191, 190, 201, 203, 75.51; 360/73

[56] References Cited

U.S. PATENT DOCUMENTS 3,914,668  10/1975  Okamoto .................................. 318/7

Primary Examiner—David Smith, Jr.
Attorney, Agent, or Firm—Sughrue, Mion, Zinn, Macpeak and Seas

[57] ABSTRACT

A reel motor control circuit for use in a tape recorder equipped with a pair of motors driving reels, respectively, is disclosed, by which the direction of tape transportation is determined by controlling conductions of transistors associated with the motor, respectively, and a possible loosening of the tape can be removed at a commencement of the forward or reverse reproducing operation of the recorder.

3 Claims, 1 Drawing Figure

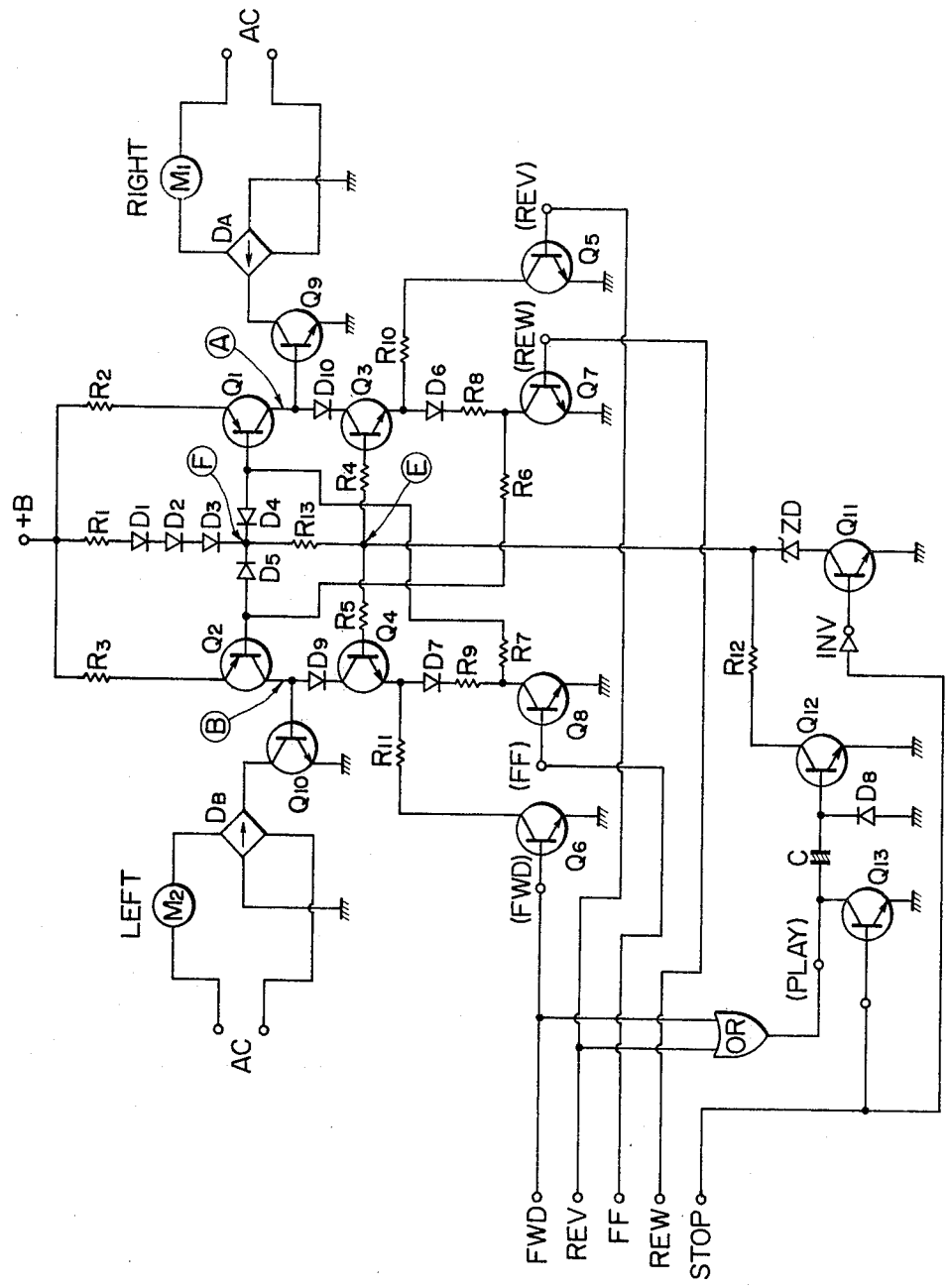

CONTROL CIRCUIT FOR A REEL MOTOR DRIVING CIRCUIT

BACKGROUND OF THE INVENTION

The present invention relates to a tape recorder and, particularly, to a reel motor drive circuit for use in a tape recorder of, for example, the so-called auto-reverse type which is equipped with a pair of motors for driving the right and left tape reels, respectively.

DESCRIPTION OF THE PRIOR ART

In a tape-recorder of the auto-reverse type in which the right and left tape reels are driven independently by a pair of motors, respectively, when the recorder is to be operated in, for example, the forward reproduction mode, the right side motor which drives the right side reel is operated constantly with a standing torque while the left side motor which drives the left side reel is operated with a smaller torque, so that a back tension is applied to the tape transported between the reels due to an electromagnetic braking effect of the left side motor. The circuit construction for controlling the operation of the motor is relatively complicated. Further, although this back tension is to be applied at the commencement of the forward reproduction, it requires a substantial time before a possible loosening of the tape between the reels is absorbed by the right side reel. This is also true for the reverse reproduction.

SUMMARY OF THE INVENTION

A primary object of the present invention is to provide a reel motor drive circuit for use in the tape recorder in which a pair of non-reversible motors are used for determining the tape transporting direction, which circuit includes an improved motor control circuit which is simple in construction.

Another object of the present invention is to provide a control circuit by which substantially equal torques are produced by the left and right motors at the commencement of the reproduction operation in either direction so that the loosening of the tape between the left and right reels is absorbed substantially instantaneously at the commencement of the reproduction operation.

BRIEF DESCRIPTION OF THE DRAWING

The single FIGURE is an embodiment of the reel motor driving circuit according to the present invention.

DETAILED DESCRIPTION OF THE EMBODIMENT

In the FIGURE, a drive circuit for a pair of reel motors is shown. A right reel motor $M_1$ and a left reel motor $M_2$ are connected to and driven by a common A.C. power source in such a way that each of the associated reels is rotated in a direction in which a tape is taken up thereon. The torques to be given to the reels by the motors $M_1$ and $M_2$ are controlled by d.c. currents (load currents) flowing through full wave rectifiers $D_A$ and $D_B$ and the amounts of the d.c. currents are controlled by the a conduction of transistors $Q_9$ and $Q_{10}$. That is, the right reel motor $M_1$ and the left reel motor $M_2$ are driven in a high speed operation (quick feeding or rewinding), a middle speed operation (reproduction) or low torque operation (back tension) according to large, middle and small base currents of the transistor $Q_9$ and $Q_{10}$, respectively.

A common constant bias determined by a potential at a junction of F of diodes $D_3$ to $D_5$ and a resistor $R_{13}$ is applied normally to bases of transistors $Q_1$ and $Q_2$, so that these transistors function as constant current sources, respectively. A common constant bias is also applied to bases of transistors $Q_3$ and $Q_4$, so that these transistors also function as constant current sources. The constant bias applied to the transistors $Q_3$ and $Q_4$ is determined by a potential at a junction E of resistors $R_4$, $R_5$ and $R_{13}$ and a Zener diode ZD.

The function of a transistor $Q_5$ is to reduce a base current of a transistor $Q_9$ by carrying away a portion of a current flowing through a point A, i.e., the current flowing through the transistor $Q_3$ when the transistor $Q_5$ turns on by a high level input at a base thereof.

The transistor $Q_6$, when turned on by a high level input at a base thereof, carries away a portion of a current flowing through a point B, i.e., through the transistor $Q_4$ to reduce the base current of a transistor $Q_{10}$. The transistors $Q_5$ and $Q_6$ are not turned on simultaneously.

When a transistor $Q_7$ is turned on by a high level input at a base thereof, the transistor $Q_2$ saturates to increase the current supply to the point B, causing the base current of the transistor $Q_{10}$ to be increased. At the same time, due to the conduction of the transistor $Q_7$, a portion of the current flowing through the transistor $Q_3$ via the point A is carried away to thereby decrease the base current of the transistor $Q_9$. When a transistor $Q_8$ is turned on by a high level input at a base thereof, the transistor $Q_1$ saturates to thereby increase the current supply to the point A and to decrease the base current of the transistor $Q_{10}$ by carrying away a portion of the current flowing through the transistor $Q_4$ and the point B. The transistors $Q_7$ and $Q_8$ are not turned on simultaneously.

A transistor $Q_{11}$ when turned on functions to apply base biases to the transistors $Q_1$ to $Q_4$. The transistor $Q_{11}$ is turned off when the motors $M_1$ and $M_2$ are to be stopped.

A transistor $Q_{12}$ is temporarily turned on by a pulse obtained by differentiating an output of a transistor 13 by a differentiation capacitor C, to lower the voltage at a point E according to a ratio of resistors $R_{12}$ and $R_{13}$. Under this condition, the transistors $Q_3$ and $Q_4$ are turned off, and the currents flowing through the points A and B are supplied to the bases of the transistors $Q_9$ and $Q_{10}$, respectively. In this case, although the current flowing through the resistor $R_1$ increases, this increase of the current does not substantially affect the potential at the point F because the value of the resistor $R_1$ is selected to be sufficiently small.

The diode $D_8$ and the transistor $Q_{13}$ form a discharge circuit for charges accumulated on the capacitor C.

With the above circuit arrangement, when a forward drive is to be performed, a high level signal H is applied to a terminal FWD, and a low level signal L is applied to terminals REV, FF, REW and STOP, respectively. Upon the applications of the high and low level signals H and L, the transistor $Q_{11}$ is turned on through an inverter INV and a certain potential is applied to points E and F through the Zener diode ZD. At the same time, since the transistor $Q_{12}$ becomes conductive for a predetermined time period determined by the differentiation function of the capacitor C, the potential at the point E becomes lower than the potential given through the Zener diode ZD, the extent of lowering being determined by the ratio of the resistors $R_{12}$ and $R_{13}$. Therefore, the transistors $Q_3$ and $Q_4$ are turned off.

Although the potential at the point F is also varied, the transistors $Q_1$ and $Q_2$ function as constant current sources, respectively, due to the fact that the base biases thereof are not changed. At this time, the collector currents of the transistors $Q_1$ and $Q_2$, which are flowing through the points A and B, respectively, are equal to the base currents of the transistors $Q_9$ and $Q_{10}$, respectively, because the transistors $Q_3$ and $Q_4$ are in non-conduction state. Therefore the transistors $Q_9$ and $Q_{10}$ become conductive to an extent that they are in half-saturated states.

Accordingly, the same amount of constant current is supplied to the motors $M_1$ and $M_2$ to rotate both with the same torques in the tape take-up direction, respectively, so that a loosened portion of the tape between the reels is absorbed.

When the voltage drop due to the resistor $R_{12}$ is set as slightly lower than the voltage across the Zener diode so that the transistors $Q_3$ and $Q_4$ are slightly conductive, a portion of the current flowing through the point B will flow through the transistor $Q_4$ and the transistor $Q_6$ which has been in the conduction state. Therefore, the conductivity of the transistor $Q_{10}$ is lowered, so that there is a difference produced between the torques of the motors $M_1$ and $M_2$. That is, the tape loosening absorption rate will be slightly lowered. The time required to absorb the loosened portion is determined by the capacitance of the capacitor C.

Since, when the capacitor C is fully charged and so the transistor $Q_{12}$ is turned off, there is no current flowing through the resistor $R_{12}$, the voltage of the Zener diode ZD is applied to the point E causing the predetermined biases to be applied to the transistors $Q_3$ and $Q_4$. Therefore, transistors $Q_3$ and $Q_4$ becomes conductive.

At this time, however, since the transistor $Q_6$ has been in the conduction state with the application of the high level signal H thereto, the current flowing through the point B is branched and carried by the transistors $Q_4$ and $Q_6$. Therefore, the base current of the transistor $Q_{10}$ is substantially reduced and thus a small torque is given to the left motor $M_2$.

At this time, however, since the transistors $Q_5$, $Q_7$ and $Q_8$ are in a non-conduction state, the current flowing through the point A is branched and still serves as the base current of the transistor $Q_9$ to keep the latter half saturated, and the torque of the right motor $M_1$ is kept constant due to the half-conduction of the transistor $Q_9$. Therefore, the torque of the motor $M_2$ is smaller than that of the motor $M_1$, so that the tape is driven by the left motor $M_1$ and taken-up on the left reel. At this time, the right motor $M_2$ serves as a reversely rotating electromagnetic brake by which a back-tension is applied to the tape.

As described hereinbefore, in the case of forward drive, the loosening of the tape is firstly absorbed and then the tape is taken-up at a constant speed on the left reel with the back tension applied by the right reel. Therefore, a tape is transported at the constant speed between the reels.

In the case of reverse drive, the high level signal H is applied to only the terminal REV and the low level signal L is applied to the remaining terminals FWD, FF, FEW and STOP. In this case, since the transistor $Q_{12}$ is also turned on for the initial predetermined time and the transistor $Q_5$ is turned on, substantially the same torques are produced by the motors $M_1$ and $M_2$ for the initial time by which the loosening of the tape is absorbed. Then the torque of the motor $M_1$ is reduced slightly. Therefore, the tape is taken up on the left reel at constant speed with the back tension being given by the right reel.

In the case of the fast feeding (FF), a high level signal H is applied to the terminal FF and a low level signal L is applied to the remaining terminals. In this case, a predetermined potential is also applied to the points E and F due to the conduction of the transistor $Q_{11}$. However, since a deep bias is applied to the transistor $Q_1$ due to the conduction of the transistor $Q_8$, the transistor $Q_1$ is saturated and the transistor $Q_2$ is half-saturated according to the potential at the point F. At this time, since the transistors $Q_5$ and $Q_7$ are non-conductive, the large current flowing through the point A flows into the base of the transistor $Q_9$ causing the latter to be saturated. On the other hand, a portion of the constant current flowing through the point B flows through the series connected transistors $Q_4$ and $Q_8$ and the remaining portions of the current flows into the base of the transistor $Q_{10}$ causing the latter to become conductive. Therefore, the maximum torque is produced by the left motor $M_1$ and a slight torque is produced by the right motor $M_2$. Accordingly the tape is taken up on the right reel at high speed with the back tension being provided by the left reel.

In the case of the rewinding operation (REW), the high level signal H is applied to the terminal REW and the low level signal L is applied to the remaining terminals. In this case, since the transistor $Q_7$ is turned on, the transistor $Q_{10}$ is saturated and the transistor $Q_9$ is half-saturated as in the case of the fast feeding operation. Therefore, the tape is taken up on the left reel at high speed with the back tension being applied by the right reel.

As described hereinbefore, according to the present invention, the loosening of the tape is rewound completely because substantially the same torques are given to the reels for a short, constant time at the commencement of the reproducing operation in either direction.

As mentioned previously, the tape transporting direction is determined by controlling the on-off operation of the transistors connected in series with the constant current source transistor.

What is claimed is:

1. A control circuit for a reel motor driving circuit for use in a tape recorder having first and second motors, said first and second motors being capable of rotating first and second tape reels, respectively, in take-up directions, comprising:
   a first motor drive transistor ($Q_9$) connected to the first motor;
   a second motor drive transistor ($Q_{10}$) connected to the second motor;
   a first switching element ($Q_1$) having a first control terminal and providing a first motor drive bias signal to the base of said first motor drive transistor in accordance with the magnitude of a control signal at said first control terminal;
   a second switching element ($Q_2$) having a second control terminal and providing a second motor drive bias signal to said second motor drive transistor in accordance with the magnitude of a control signal at said second control terminal;
   means for providing substantially identical control signals to said first and second switching elements;

a first current path ($Q_3$) for conducting a portion of said first motor drive bias signal away from said base of said first motor drive transistor;

a second circuit path ($Q_4$) for conducting a portion of said second motor drive bias signal away from said base of said second motor drive transistor;

a third switching element ($Q_7$) connected in series with said first current path and also connected to said second control terminal, said third switching element being conductive in response to a third control signal to thereby reduce the bias signal supplied to the base of said first motor drive transistor and to simultaneously alter said first control signal to increase the bias signal supplied to the base of said second motor drive transistor; and a fourth switching element ($Q_8$) connected in series with said second current path and also connected to said first control terminal, said fourth switching element being conductive in response to a fourth control signal to thereby decrease the bias signal provided to the base of said second motor drive transistor and to simultaneously alter said first control signal to increase the bias signal provided to the base of said first motor drive transistor.

2. The control circuit as set forth in claim 1, further comprising:

a fifth switching element ($Q_5$) connected in series with said first current path and conductive in response to a fifth control signal to decrease the bias signal provided to the base of said first motor drive transistor without substantially changing the bias signal provided to said second motor drive transistor, whereby said tape will be taken up by said second tape reel and will be transported in one direction with a constant back tension; and a sixth switching element ($Q_6$) connected in series with said second current path and conductive in response to a sixth control signal to decrease the bias signal provided to the base of said second motor drive transistor without substantially affecting the bias signal provided to the base of said first motor drive transistor, whereby said tape will be taken up by said first tape reel and will be transported in an opposite direction with constant back tension.

3. The control circuit as set forth in claim 2, further comprising means ($Q_{12}$) responsive to either of said fifth and sixth control signals for instantaneously and temporarily increasing said first and second control signals to thereby eliminate any tape slack.

* * * * *